United States Patent [19]
Heyl

[11] Patent Number: 4,770,611
[45] Date of Patent: Sep. 13, 1988

[54] PRODUCT PUMP ASSEMBLY

[75] Inventor: Robert D. Heyl, Williamsport, Pa.

[73] Assignee: The Young Industries, Inc., Muncy, Pa.

[21] Appl. No.: 144,727

[22] Filed: Jan. 14, 1988

Related U.S. Application Data

[63] Continuation of Ser. No. 861,124, May 7, 1986, abandoned, which is a continuation of Ser. No. 670,907, Nov. 13, 1984, abandoned.

[51] Int. Cl.$^4$ ............................................. B65G 53/12
[52] U.S. Cl. ................................ 417/147; 417/149; 406/146; 137/907
[58] Field of Search .................. 417/149, 137, 147; 406/109, 126, 124, 125, 132, 136, 137, 146, 24, 25, 32; 137/884, 907 X

[56] References Cited

U.S. PATENT DOCUMENTS

| | | | |
|---|---|---|---|
| 1,358,987 | 11/1920 | Prince | 137/907 X |
| 2,723,057 | 11/1955 | Golden | 406/146 X |
| 2,878,969 | 3/1959 | Griswold | 406/146 |
| 3,780,757 | 12/1973 | Jordan | 417/149 X |
| 3,799,622 | 3/1974 | Hek | 406/109 |
| 3,861,830 | 1/1975 | Johnson | 417/149 |
| 4,118,075 | 10/1978 | Lübbehusen | 406/125 X |
| 4,168,864 | 9/1979 | Weeks | 406/109 X |
| 4,501,518 | 2/1985 | Smith | 406/109 X |
| 4,558,845 | 12/1985 | Hunkapiller | 137/884 X |

FOREIGN PATENT DOCUMENTS

| | | | |
|---|---|---|---|
| 3144592 | 5/1983 | Fed. Rep. of Germany | 406/124 |
| 1194603 | 5/1959 | France | 406/126 |

*Primary Examiner*—Carlton R. Croyle
*Assistant Examiner*—T. Olds
*Attorney, Agent, or Firm*—Lalos & Keegan

[57] ABSTRACT

A product pump assembly including a product pump having a product receiving inlet, a product discharge outlet, a product chamber, and an air port. A cone-shaped feed valve in the product chamber is forced upwards against the inlet thereby sealing it when pressurized air is forced through the port into the chamber, during the evacuation cycle of the pump assembly. The pressurized air is deflected against the valve sweeping the product out of the chamber through the outlet and via a delivery line to the product collector. An ejector is energized during the fill cycle to withdraw the air from the chamber through the air port, thereby opening the valve and pulling the product into the chamber.

22 Claims, 5 Drawing Sheets

PRODUCT PUMP ASSEMBLY

This is a continuation of co-pending application Ser. No. 861,124, filed on May 7, 1986, now abandoned, which was a continuation of co-pending application Ser. No. 670,907, filed on Nov. 13, 1984, now abandoned.

FIELD OF THE INVENTION

This invention relates to product pumps that move product from the discharge of a hopper, bin, silo or other device containing the product and delivering the product to one or more collecting points by means of a dense-phase, positive-pressure, pneumatic conveying system, and the product pump assembly and product pump therefor. It more particularly relates to such pump assemblies which are used to discharge into pressurized vessels or into liquids that cause a high system back pressure. It also relates to such pump assemblies which can be used to convey products that are light and fluffy or otherwise have poor flow characteristics.

BACKGROUND OF THE INVENTION

Existing product pumps rely on gravity to transfer the product from a hopper, or the like, into a pump chamber. However, gravity flow limits a pump to use with free flowing products. Also, product pumps in the past were unable to discharge into a vessel that gave a high back pressure.

Small quick cycling product pumps were frequently used as a means of introducing a product into a pneumatic conveying line. Each successive cycle of the pump pushed a new charge of product into the conveying line and the air trapped between each charge pushed the previously-loaded charge further along the conveying line. These devices are normally cycled with electric or pneumatic controls incorporating adjustable timing devices. The timers are arranged to vary the time of each function within the cycle so that the system can be adjusted to meet varying field conditions. The cycle starts with the product inlet valve open and product flows by gravity from the hopper, or the like, into the product pump. After a short fill time, the product inlet valve is closed and the air pressure is applied to the pump chamber to force the product charge from the pump into the conveying line. After the air flow is shut off, air pressure remains in the product pump and in the conveying line. Some of this air will dissipate through the product charge and out the discharge of the conveying system providing a delay time is employed between the compressed air shut off and the opening of the product inlet valve. In actual practice, a delay time is selected that permits some compressed air to bleed off down the pipe with the remaining compressed air blowing up into the product when the inlet valve is opened. Both the time required to bleed off the compressed air and the air blowback reduce the overall delivery rate of the pneumatic conveying system. Additionally, the higher the back pressure at the discharge of the system, the greater the inlet venting problem. Also, a high rate of blowback at the inlet feed point often causes a dust problem. It is further noted that this type of system cannot be used to transport to a pressurized vessel or into a liquid that presents a large hydraulic back pressure.

OBJECTS OF THE INVENTION

Accordingly, it is the principal object of the present invention to provide an improved means for moving product by dense phase positive pressure pneumatic conveying means from a storage container to a collecting point.

Another object of the present invention is to provide a novel conveying system which can convey products that are light and fluffy or otherwise have poor flow characteristics.

A further object of the present invention is to provide a novel system that can discharge the product into a high pressurized vessel or into a liquid that causes a high system back pressure.

A still further object of the present invention is to provide a novel conveying system which eliminates or minimizes the dust problems previously experienced.

Another object is to provide a novel pumping system with increased hourly conveying rates.

A further object is to provide a pump which completely discharges the product from its product chamber during each cycle.

A still further object is to provide a novel pump system which decreases the time required to discharge the product from the pump, and which has an overall improved capacity.

Another object is to provide a novel pump which permits the pump to be designed with a low profile to reduce the required head room.

A further object is to provide a novel pump design which eliminates the need for a lower compressed air line into the pump.

A still further object is to provide an inlet valve design which utilizes an improved and novel means to close the product inlet and to effectively hold it in the closed position during the product conveying cycle.

Another object is to provide a novel product pump which insures that the inlet valve will not open prematurely and allow compressed air to escape into the material which may retard the flow of material into the pump and create dust problems.

Other objects and advantages of the present invention will become more apparent to those persons having ordinary skill in the art from the following description taken in conjunction with the accompanying drawings.

DESCRIPTION OF THE PREFERRED EMBODIMENT

Figure 1:
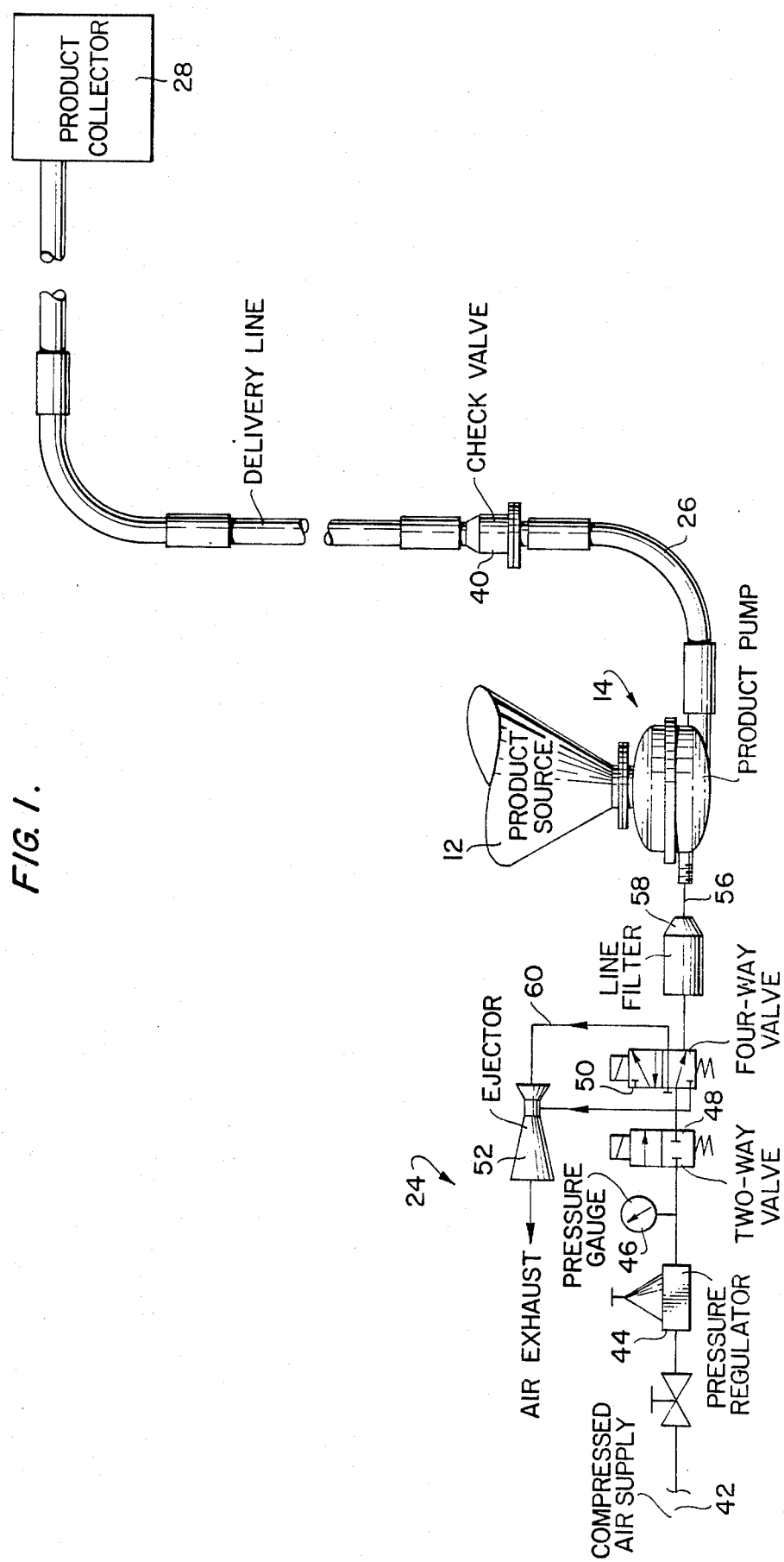
FIG. 1 is a schematic view of a product pump assembly embodying the present invention.
Figure 2:
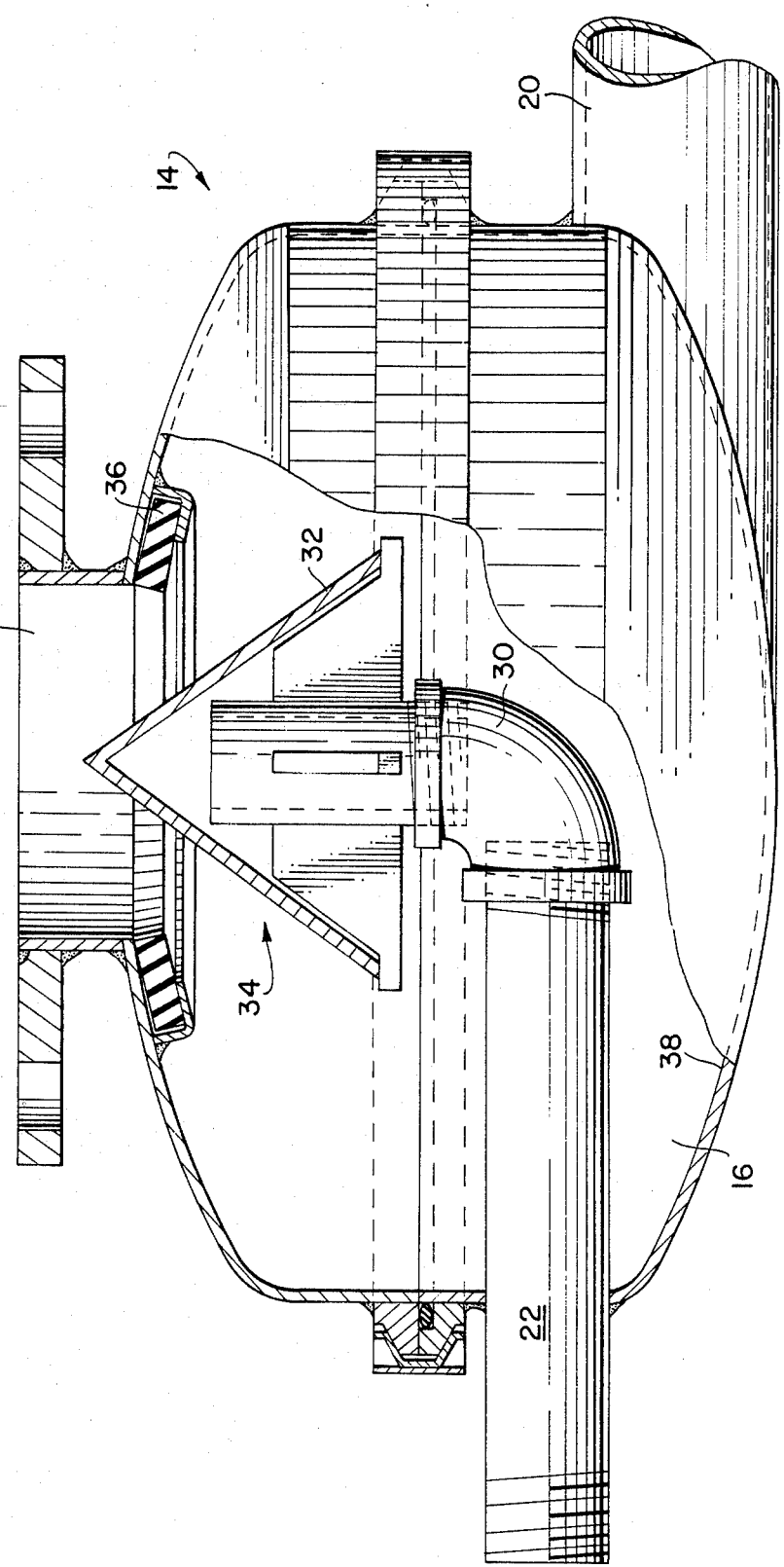
FIG. 2 is an enlarged fragmentary view of the product pump of FIG. 1 illustrated in isolation.
Figure 3:
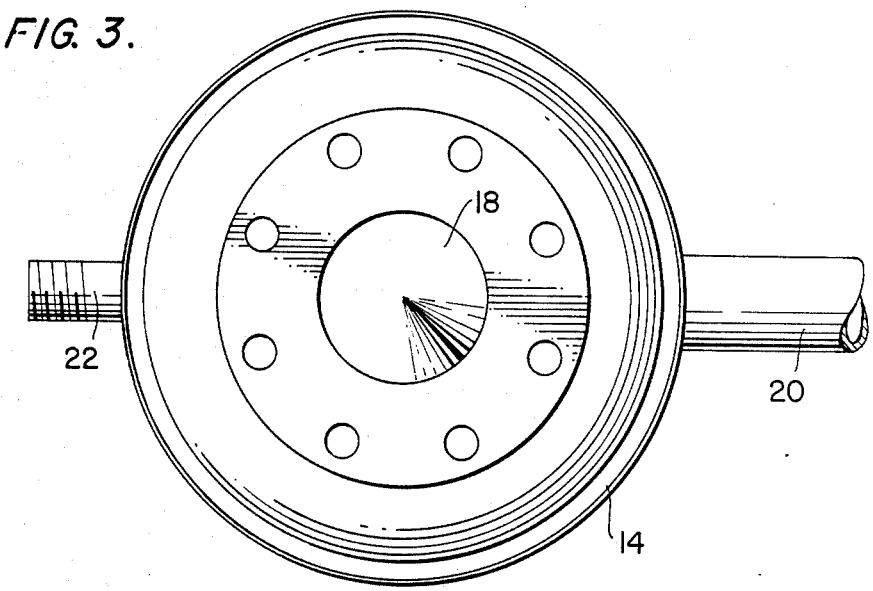
FIG. 3 is a top plan view of the product pump of FIG. 2.

Referring to FIG. 1, an apparatus embodying the present invention is illustrated schematically at 10. Apparatus 10 is shown to include a product source 12, and a product pump shown generally at 14 having, as shown in FIG. 2, a product chamber 16, a product receiving inlet 18, a product discharge outlet 20 and an air inlet pipe 22. An air supply system shown very generally at 24 supplies pressurized air into air inlet pipe 22 thereby forcing the product in product chamber 16 out product discharge outlet 20 through a delivery line 26 to the product collector 28.

Product pump 14 is best illustrated in FIG. 2. It is seen therein that air inlet pipe 22 enters the product pump through the lower half thereof and an elbow member 30 directs the pressurized air upwards into the cone member 32 of the feed valve shown generally at 34. Thus, when the pressurized air is forced by air supply system 24 through air inlet pipe 22 into product pump 14, the air is forced up against the inside surfaces of cone member 32 thereby causing it to move upwardly until it is seated against the resilient valve seat assembly 36 at product receiving inlet 18. The force of the incoming air not only moves cone member 32 into its seated position but holds it firmly against the seat thereby defining an effective seal preventing additional product to gravity flow into the chamber and pressurized air from flowing out the inlet. Additionally, when air supply system 14 is in its vacuum state wherein air is drawn through air inlet pipe 22 out of product chamber 16, cone member 32 is caused to move down into its open position, as shown in FIG. 2. This vacuum that is thereby created helps to fill chamber 16, which is especially important when loading light or fluffy particles. It is further obvious from FIG. 2 that when the air is forced into product chamber 16 and against the interior surface of cone member 32 it is thereby deflected by the cone member towards the chamber floor 38 of product chamber 16 causing a sweeping action of the product off the floor 38 and out the product discharge outlet 20. This helps provide for an effective complete discharge of the product during the conveying cycle.

Figure 4:
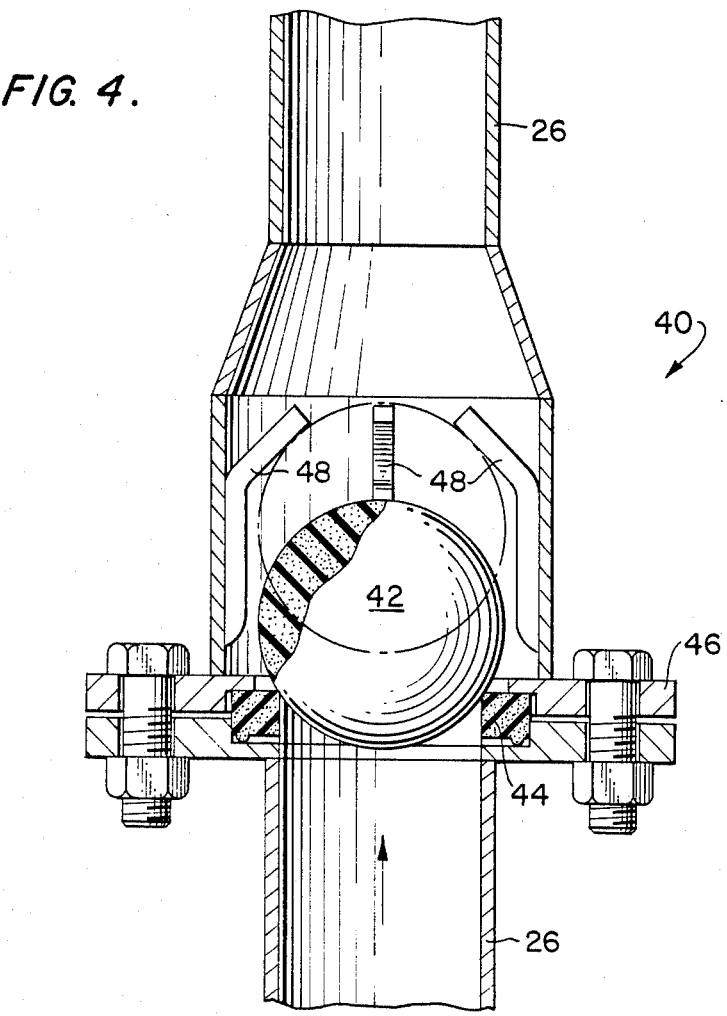
FIG. 4 is an enlarged fragmentary side view of the check valve of FIG. 1.

A check valve 40 is positioned on delivery line 26 between product pump 14 and the product collector 28 at a location in close proximity to product discharge outlet 20. Check valve 40, which is shown in greater detail in FIG. 4, is used to isolate the air pressure in delivery line 26 and stop the back flow of compressed air into product pump 14 when pump 14 is placed under negative pressure. Check valve 40 can be constructed as shown in FIG. 4 with the air from the product pump passing through the two-inch delivery line and forcing the 2.5 inch diameter Neoprene ball 42 off of the seat 44, which is adjacent the valve flanges 46, and up against four spaced, upwardly-curved members 48 with the air flowing between the members into the outflow delivery line. When the air is sucked down the delivery line, ball 42 is caused to be seated in seat 44, as shown in FIG. 4, thereby blocking the air flow back into the product pump.

Air supply system 24 illustrated in FIG. 1 thus performs three functions: (1) it supplies compressed air to product pump 14 to force the product out of the product discharge outlet 20, (2) it creates a suction in the product chamber 16 during the filling times pulling the product into the chamber, and (3) it opens and closes feed valve 34. System 24 is seen to comprise a compressed air supply 42, a pressure regulator 44 and a pressure gauge 46 leading to a two-way valve 48. A four-way switch valve 50 is provided for controlling the compressed air supply. It can be a solenoid actuated, spring-return, four-way two-position valve such as are commercially available from the Parker-Hannifin Corporation and the Arrow Corporation. One position of switch valve 50 directs the compressed air into the product pump 14 during the conveying portion of the cycle, and when the valve is in this position all other ports are unused. The second position of switch valve 50 directs the compressed air into an ejector 52. The vacuum port of ejector 52 is connected through switch valve 50 to the line 56 going to the air inlet pipe product pump 14. This is the same line that is used to deliver the compressed air to the product pump during the conveying portion of the cycle. When the conveying portion of the cycle is complete, switch valve 50 shifts and sends the compressed air to the ejector 52. The positive pressure remaining from the conveying portion of the cycle is quickly reduced to a negative pressure and feed valve 34 is thereby opened. The negative pressure in the product pump eliminates the compressed air that in other pumps vents through the inlet valve and into the product.

A line filter 58 is provided between product pump 14 and switch valve 50 on line 56. Line filter 58 effectively prevents dust from entering switch valve 50 when product pump 14 is placed under a negative pressure. Line filter 58 is automatically purged of dust during the next pressure portion of the pump's cycle.

When product pump 14 is in operation, the hourly conveying rate is dependent upon the time required to load product into the pump and the time required to discharge the product from the pump into delivery line 26. To maintain the design rate, the pump must discharge the product completely to make room for a new charge of product. Ejector 52 is used to create a negative pressure which then forces the product into the pump. This arrangement reduces the time required to load the product into the pump. The product pump operation is initiated when the power is turned on. The pump sequence is controlled by three adjustable timers.

Figure 6:
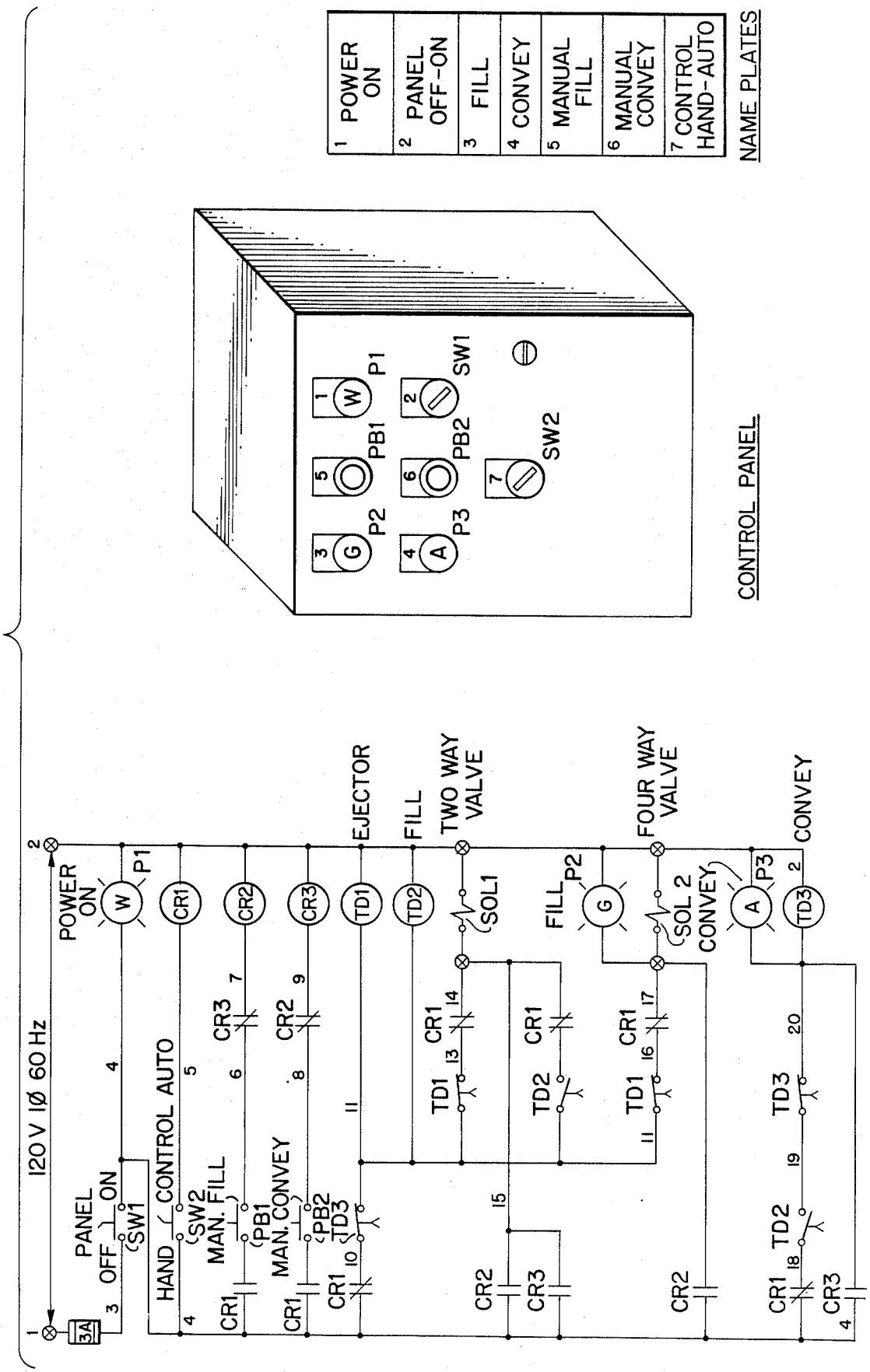
FIG. 6 is an electrical schematic and a front view of the control panel of the product pump assembly of FIG. 1.

Referring to FIG. 6, the sequence of operation of the timers is as follows:

1. The off-on switch SW1 turns the power on for the control panel. Control switch SW2 is a selector switch used to place the control in either manual (hand) or automatic (auto) operation. The normal position for this switch is the auto position. The control panel is also furnished with two momentary contact push button stations PB1 and PB2 to provide for manual filling or manual conveying.

2. For normal operation, control switch SW2 is placed in the "auto" position and the panel is turned on by placing switch No. 1 in the "on" position. This will energize the control relay CR1, the ejector timer TD1 and the fill ltimer TD2. Also, the two-way valve solenoid SOL 1 and the four-way valve solenoid SOL 2 are activated. When energized two-way valve 48 opens to turn on the compressed air to the system. Four-way valve 50 shifts to direct the compressed air to ejector 52 and connects the negative pressure line to product pump 14.

3. When the ejector timer TD1 times out, two-way valve 48 closes and four-way valve 50 shifts to the conveying position. Fill timer TD2 continues to time until the timer times out and energizes two-way solenoid SOL 1 and timer delay TD3. When energized, two-way solenoid SOL 1 opens and conveying is started. When timer TD3 times out, conveying stops and the sequence returns and activates ejector timer TD1 and fill timer TD2.

4. To arrange the control for manual operation, selector switch SW2 is placed in the "hand" position. For manual filling, push button PB1 is pressed and for manual conveying push button PB2 is pressed. Interlocking contacts are provided so that only one push button can be energized at any one time.

5. Three pilot lights are provided on the control panel. A white pilot light P1 is used to show when the panel is turned on, a green pilot light P2 will show when the product pump is filling and amber pilot light P3 shows when the system is conveying.

In conclusion, the pump sequence starts at the beginning of the fill cycle and times through the following sequence:

1. When the power is turned on, ejector 52 and the fill timers TD2 are energized along with the two-way and four-way valve solenoids, SOL 1 and SOL 2. Two-way valve 48 opens to turn on the compressed air. Shift valve 50 shifts to direct the compressed air to ejector 52 and connects the negative pressure line 60 to the product pump.

Figure 5:
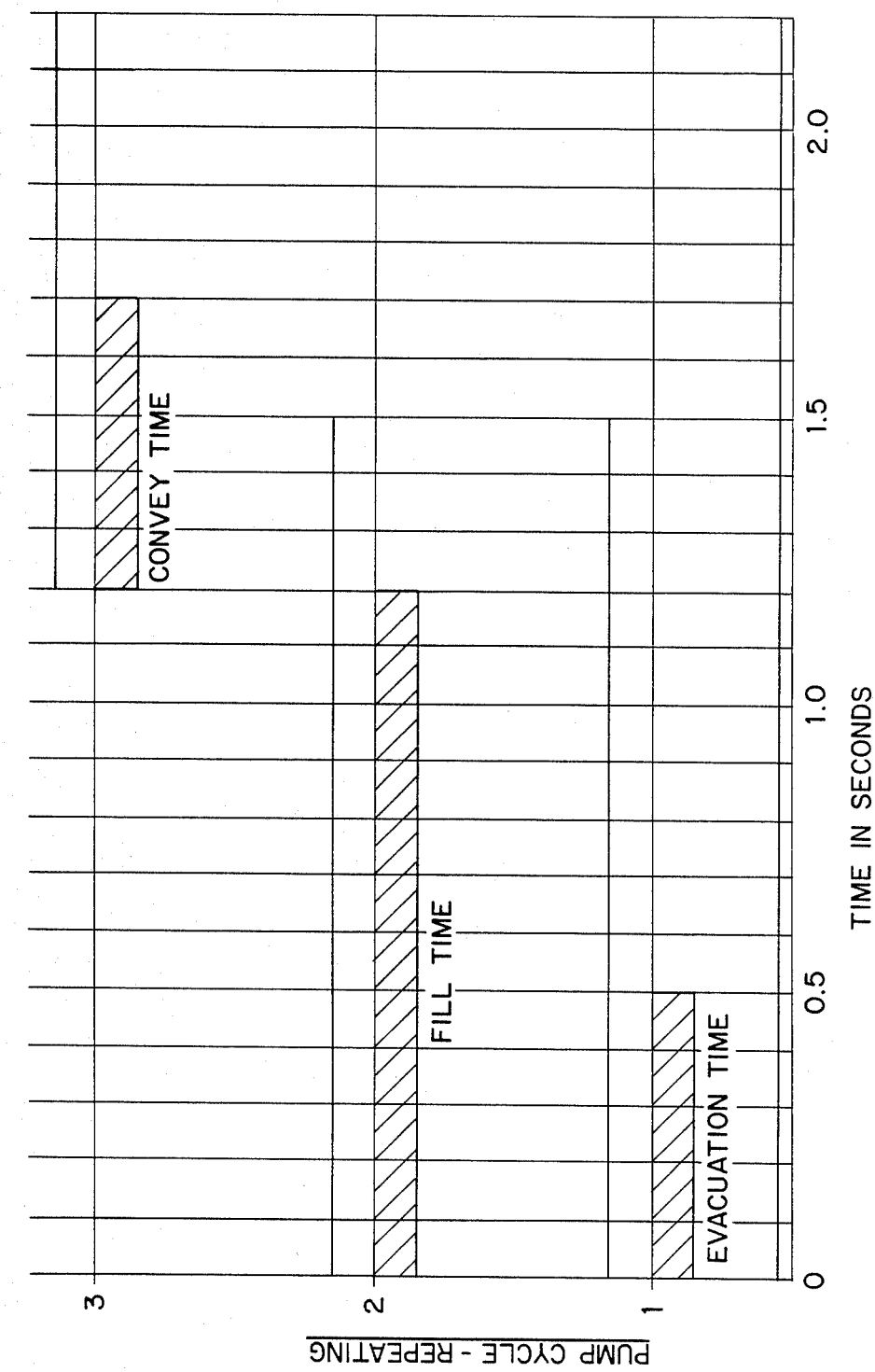
FIG. 5 is a graph illustrating the cycle of the product pump of FIG. 1.

2. These two-way valves remain in this position until ejector timer TD1 times out and de-energizes both valve solenoids. When de-energized, two-way valve 48 closes to shut off the compressed air and shift valve 50 shifts to align the compressed air line 56 to product pump 14. The ejector timer TD1 is adjustable from zero to 1.5 seconds, and the normal setting is between 0.5 and 1.0 seconds, as best illustrated in FIG. 5.

3. When energized, fill timer TD2 times for a preset time then energizes the convey timer and the two-way valve solenoid 48. The fill timer TD2 is adjustable from zero to 1.5 seconds, with the normal setting being between 0.8 and 1.2 seconds, as best illustrated in FIG. 5. When setting ejector 52 and the fill timers, it is noted that the ejector time setting is never greater than the fill timer setting.

4. When two-way valve 48 is energized it opens to turn on the compressed air, which is directed through switch valve 50 to product pump 14 and conveying commences. The convey timer is adjustable from zero to 0.6 seconds, with the normal setting being between 0.1 and 0.4 seconds.

5. When the convey timer times out, the two-way valve 48 closes to shut off the compressed air and the sequence is complete. Product pump 14 continues to cycle, as explained above, until the power to the timer is turned off when the desired amount of material has been conveyed from product source 12 to product collector 28.

From the foregoing detailed description, it will be evident that there are a number of changes, adaptations and modifications of the present invention which come within the province of those skilled in the art. However, it is intended that all such variations not departing from the spirit of the invention be considered as within the scope thereof and as limited solely by the appended claims.

I claim:

1. A pump assembly for particulate materials comprising a housing providing a chamber, said housing having an inlet port at an upper end thereof communicating with said chamber and communicable with a supply of particulate material and an outlet port at a lower end thereof and laterally relative to said inlet port, communicating with said chamber and communicable with a material conveying means, a valve member disposed in said chamber and movable between closed and opened positions relative to said inlet port, and conduit means communicable selectively with a source of fluid under pressure and a suction source and directed toward said valve member whereby upon communicating said conduit means with said pressurized fluid source, a stream of fluid under pressure will be caused to impinge upon at least one surface of said valve member to urge said valve member into its closed position and preclude the flow of particulate material into said chamber, and upon communicating said conduit means with said suction means, said valve member will be caused to move to its open position to allow the flow of particulate material into said chamber, said valve surface being configured to deflect said stream downwardly and outwardly from said valve member causing particulate material deposited in said chamber to be flushed out of said chamber through said outlet port.

2. An assembly according to claim 1 wherein said conduit means includes means for supporting said valve member.

3. An assembly according to claim 1 wherein said deflecting valve surface is conically configured.

4. An assembly according to claim 1 wherein said valve member is provided with a conical seating surface.

5. An assembly according to claim 1 wherein said outlet port is positioned in a path of the flow of particulate material being flushed out by a deflected stream of pressurized fluid.

6. An assembly according to claim 1 wherein said outlet port is disposed away from and outwardly of said valve member.

7. An assembly according to claim 1 wherein said housing is provided with upper, lower and side walls, said inlet port is disposed in said upper wall and said outlet port is disposed in said side wall adjacent said lower wall.

8. An assembly according to claim 7 wherein said valve surface is configured to deflect a stream of pressurized fluid downwardly and laterally.

9. An assembly according to claim 1 wherein said chamber is provided with surfaces configured to guide deflected streams of said pressurized fluid toward said outlet port.

10. An assembly according to claim 1 wherein said chamber is provided with a surface disposed in opposed relation to said deflecting valve surface upon which particulate material is deposited and from where it is flushed toward and out through said outlet port.

11. An assembly for conveying batches of a particulate material comprising a pump assembly, said pump assembly including a housing providing a chamber, said housing having inlet and outlet ports communicating with said chamber, said inlet port being disposed at an upper end of said housing and said outlet port being disposed at a lower end of said housing and laterally relative to said inlet port, a valve member disposed in said chamber and movable between closed and opened positions, and conduit means for directing a stream of fluid under pressure toward said valve member to move it into its closed position, said valve member having a surface upon which said stream of pressurized fluid impinges, configured to deflect said stream downwardly and outwardly from said valve member whereby particulate material deposited in said chamber will be flushed out of said chamber through said outlet port, means for supplying a flow of particulate material into said chamber through said inlet port, a source of pressurized fluid, suction means, means for selectively communicating said pressurized fluid source with said conduit means for moving said valve member into its closed position and flushing particulate material from said chamber, and said suction source with said conduit means for causing said valve member to move into its open position and allow the flow of particulate material into said chamber, means for collecting particulate material and conveying means intercommunicating said outlet port and said material collecting means.

12. An assembly according to claim 11 including filter means disposed in said conduit means.

13. An assembly according to claim 11 wherein said conveying means includes a check valve.

14. An assembly according to claim 11 wherein said means for supplying a flow of particulate material to said chamber comprises a hopper for supplying particulate material to said chamber by gravity flow.

15. An assembly according to claim 11 wherein said means for selectively communicating said pressurized fluid source and said suction source with said conduit means comprises a selector valve.

16. An assembly according to claim 11 wherein said suction means comprises an ejector apparatus.

17. An assembly according to claim 16 including means for selectively communicating said pressurized fluid source and said ejector apparatus to apply a suction to said conduit means.

18. An assembly according to claim 17 including timing means operatively connected to said means for selectively communicating said pressurized fluid and suction sources with said conduit means.

19. An assembly according to claim 18 wherein said timing means is operative to communicate said pressurized fluid and suction sources with said conduit means for selected predetermined periods of time.

20. An assembly according to claim 19 wherein said means for selectively communicating said pressurized fluid and suction sources is operative to alternatively communicate said pressurized fluid and suction sources with said conduit means.

21. A pump assembly for particulate materials comprising a housing providing a chamber, said housing having an inlet port communicating with said chamber and communicable with a supply of particulate material and an outlet port communicating with said chamber and communicable with a material conveying means, a valve member disposed in said chamber and movable between closed and open positions relative to said inlet port, and conduit means continuously communicating with said chamber and communicable selectively with a source of fluid under pressure and a suction source, and directed toward said valve member whereby upon communicating said conduit means with said pressurized fluid source, a stream of fluid under pressure will be caused to impinge upon at least one surface of said valve member to urge said valve member into its closed position and preclude the flow of particulate material into said chamber, and upon communicating said conduit means with said suction means, said valve member will be caused to move to its open position to induce the flow of particulate material into said chamber, said valve surface being configured to deflect said stream away and outwardly from said valve member causing particulate material deposited in said chamber to be flushed out of said chamber through said outlet port.

22. An assembly for conveying batches of a particulate material comprising a pump assembly, said pump assembly including a housing providing a chamber, said housing having inlet and outlet ports communicating with said chamber, a valve member disposed in said chamber and movable between closed and open positions, and conduit means continuously communicating with said chamber for directing a stream of fluid under pressure toward said valve member to move it into its closed position, said valve member having a surface upon which said stream of pressurized fluid impinges, configured to deflect said stream away and outwardly from said valve member whereby particulate material deposited in said chamber will be flushed out of said chamber through said outlet port, means for supplying a flow of particulate material into said chamber through said inlet port, a source of pressurized fluid, suction means, means for selectively communicating said pressurized fluid source with said conduit means for moving said valve member into its closed position and flushing particulate material from said chamber, and said suction source with said conduit means for causing said valve member to move into its open position and induce the flow of particulate material into said chamber, means for collecting particulate solids and conveying means intercommunicating said outlet port and said material collecting means.

* * * * *